US006373995B1

United States Patent
Moore

(10) Patent No.: US 6,373,995 B1
(45) Date of Patent: Apr. 16, 2002

(54) METHOD AND APPARATUS FOR PROCESSING IMAGE DATA ACQUIRED BY AN OPTICAL SCANNING DEVICE

(75) Inventor: Charles E. Moore, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/187,457

(22) Filed: Nov. 5, 1998

(51) Int. Cl.$^7$ .................................................. G06K 9/18
(52) U.S. Cl. ......................... 382/284; 382/294; 345/629
(58) Field of Search .................................. 382/284, 294, 382/278, 282, 287, 291, 312, 318; 345/629, 421, 635; 348/584, 274; 358/450, 482, 483

(56) References Cited

U.S. PATENT DOCUMENTS

| | | | |
|---|---|---|---|
| 5,649,032 A | * 7/1997 | Burt et al. .................... | 382/284 |
| 5,719,949 A | * 2/1998 | Koeln et al. ................ | 382/113 |
| 5,764,809 A | * 6/1998 | Nomami et al. ............ | 382/284 |
| 5,812,704 A | * 9/1998 | Pearson et al. ............. | 382/284 |
| 6,038,349 A | * 3/2000 | Cullen ........................ | 382/294 |

* cited by examiner

Primary Examiner—Bhavesh Mehta
Assistant Examiner—Yosef Kassa
(74) Attorney, Agent, or Firm—Alex J. Neudeck

(57) ABSTRACT

A method and apparatus for scanning an original image with an optical scanning device and for constructing a duplication of the original image. The apparatus of the present invention comprises an optical scanning device for scanning the original image and for generating an electrical representation of the original image. The scanning device comprises an illumination device for projecting light onto an original image being scanned, an optical image sensing device disposed to receive light reflected from the original image, and a processing device in communication with the optical image sensing device for receiving electrical signals produced by the optical sensors of the optical image sensing device and for processing the electrical signals. The optical image sensing device comprises a plurality of optical sensors. Each optical sensor has a field of view and at least two of the optical sensors have fields of view which at least partially overlap. Each optical sensor generates electrical signals relating to the portion of the original image within the field of view of the respective optical sensor. The processing device processes the image data obtained by the optical sensors and determines the amount of overlap of the images obtained by adjacent optical sensors. Once the amount of overlap has been determined, the processing device uses the determined amount of overlap to construct a duplicate of the original image. Preferably, sub-arrays of data suspected of overlapping are correlated to obtain values of a correlation array. The values of the correlation array are then analyzed to determine which data in the sub-arrays is overlapping image data. The overlap is then eliminated to construct a duplication of the original image.

20 Claims, 7 Drawing Sheets

METHOD AND APPARATUS FOR PROCESSING IMAGE DATA ACQUIRED BY AN OPTICAL SCANNING DEVICE

TECHNICAL FIELD OF THE INVENTION

The present invention relates to a method and apparatus for processing image data acquired by an optical scanning device and, more particularly, to an image processing system which receives overlapping image data acquired by an optical scanning device and which reconstructs an original image from the overlapping images.

BACKGROUND OF THE INVENTION

Image scanning devices such as, for example, flat bed image scanners and sheet feed image scanners, are commonly used to scan documents containing image information to convert the image information contained on the document into a digital representation of the document. Image scanning devices typically utilize a linear imaging device which is scanned across a document being imaged to produce multiple one-dimensional (1-D) slices of the image which are subsequently processed and combined to produce a two-dimensional (2-D) digital representation of the image contained on the document.

A light source comprised by the image scanning device projects light onto the document being scanned and the light reflected from the document is focused by imaging optics onto the linear imaging device. The linear imaging device comprises one or more photosensor which convert the light reflected from the document into analog signals. The analog signals are then converted by an analog-to-digital converter into a digital representation. The digital representation is then processed by a processing circuit such as, for example, a microprocessor or a digital signal processor in accordance with a predetermined algorithm to produce an output. The output may be, for example, a reproduction of the original image scanned.

Generally, image scanning devices can be categorized into two categories, namely, image scanning devices which utilize an optical reduction system in combination with a single photosensor and image scanning devices which utilize a contact image sensor comprised of a plurality of photosensor in combination with an array of optical fibers which function as the imaging optics. In a reduction system of an image scanning device, a single, relatively small, high-resolution linear image sensor is used to capture an image of the object (e.g., a document) being scanned. Since the image sensor is relatively small, reduction optics are used to reduce the size of the images contained on the object into smaller images which fit onto the photosensor.

An advantage of image scanning devices which utilize reduction systems is that only a small image sensor, i.e., a single photosensor, is required for capturing an image of the object being scanned, which is normally relatively inexpensive to manufacture. One disadvantage of image scanning devices which utilize reduction systems is that the reduction optics require a relatively long optical path in order to focus the object image onto the single photosensor, which, consequently, increases the overall size of the image scanning device. Although attempts have been made to "fold" the optical path by incorporating a plurality of mirrors into the imaging optics in order to reduce the size of the image scanning device, additional mirrors increase light loss and increase the cost of the imaging optics. Another disadvantage of image scanning devices which utilize reduction systems is that producing relative motion between the object being scanned and the photosensor often involves substantial mechanical difficulty and, consequently, can lead to malfunctions and increased maintenance costs.

A typical contact image sensor utilized in an image scanning device has a length equal to the length of the 1-D scan to be performed. Typically, the contact image sensor comprises an array of photosensor, rather than a single photosensor, because a single photosensor having a length equal to the 1-D length of the scan to be performed is extremely difficult and expensive to manufacture. Therefore, a plurality of photosensor are closely aligned with each other in a linear array so that the photosensor are in contact with each other and so that no gaps exist between the photosensor.

In order to focus the image of the object being scanned onto the array, an array of optical fibers is utilized as the imaging optics for focusing the light from the object being scanned onto the contact image sensor. A one-to-one relationship is required between the photosensor of the array and the optical fibers of the imaging optics due to the fact that the fields of views of the optical fibers with respect to their respective photosensor overlap. If a one-to-one relationship is not maintained between the optical fibers and the photosensor, the original object image will not be capable of being accurately reconstructed from the individual 1-D images focused onto the photosensor by the optical fibers.

One advantage of implementing a contact image sensor in an image scanning device is that the optical path of the imaging optics is relatively short, which reduces the overall size of the image scanning device. A disadvantage of utilizing a contact image sensor is that the array of photosensor must have a length equal to the length of the 1-D scan being performed. Also, it is a difficult and expensive process to place the individual photosensor in the array and align them since this task must be performed monolithically in silicon.

In order to create an photosensor array of this length, full-sized photosensor must be used in the array, which typically are expensive due to the fact that they are monolithically manufactured in silicon and require a relatively large amount of silicon area. The photosensor cannot be fabricated in the same dice. A separate dice must be used for each photosensor. Therefore, each dice must be cut to precise tolerances and then all of the dice must be carefully placed in alignment to create a long line which matches the length of the object (e.g., the document) being scanned. This is a difficult and expensive process. In fact, the alignment process is so difficult that it generally is done by hand, often leading to alignment errors which require that the entire array be discarded, or scrapped. This loss significantly increases the overall cost of the image scanning device since the die are typically the largest percentage of the overall cost of the contact image sensor.

Accordingly, a need exists for an image scanning device having a relatively short optical path and which is capable of utilizing an image sensor which is relatively inexpensive to manufacture.

SUMMARY OF THE INVENTION

The present invention provides a method and apparatus for constructing a representation of an original image scanned with an optical scanning device. The apparatus of the present invention comprises a processing device for generating an electrical representation of the original image scanned with the optical scanning device and for processing the electrical representation to obtain a representation of the original image.

Preferably, the scanning device used with the processing device of the present invention comprises an illumination device for projecting light onto an original image being scanned and an optical image sensing device disposed to receive light reflected from the original image. The processing device is in communication with the optical image sensing device for receiving electrical signals produced by the optical sensors of the optical image sensing device and for processing the electrical signals. The optical image sensing device comprises a plurality of optical sensors. Each optical sensor has a field and at least two of the optical sensors have fields of view which at least partially overlap. Each optical sensor generates electrical signals relating to the portion of the original image within the field of view of the respective optical sensor.

The processing device processes the image data obtained by the optical sensors and determines the amount of overlap of the images obtained by adjacent optical sensors. Once the amount of overlap has been determined, the processing device uses the determined amount of overlap to construct a representation of the original image.

The processing device preferably comprises an analog-to-digital converter (ADC), a memory device and a computer. The ADC receives the electrical signals produced by the optical sensors and generates digital signals representative of the images within the fields of view of the optical sensors. The computer receives the digital signals generated by the analog-to-digital converter and stores the digital representations corresponding to the image data in the memory device. The computer reads the image data out of the memory device and utilizes first and second sub-arrays of the image data to determine the amount of overlap in the images obtained by adjacent optical sensors. The computer correlates the sub-arrays to determine the areas of overlap in the images and then uses this determination to construct the representation of the original image.

In accordance with the preferred embodiment of the present invention, the computer correlates the sub-arrays by aligning particular elements in the first sub-array with one or more particular elements in the second sub-array, by multiplying the aligned elements together, by summing the products obtained as a result of the multiplication operations, and by storing the sum of the products as elements in the correlation array. After all of the elements of the correlation array have been produced, the computer determines which element of the correlation array has the largest value. The image data which corresponds to this value in the correlation is the overlapping image data.

In accordance with a second embodiment of the present invention, the computer correlates the sub-arrays by aligning particular elements in the first sub-array with particular elements in the second sub-array, by obtaining the differences between the values of the aligned elements in the sub-arrays, by obtaining the absolute values of the differences, by summing the absolute values, and by storing the sums as elements of the correlation array. The computer then determines which element of the correlation array has the smallest value. In this case, the smallest element in the correlation array corresponds to the overlapping image data.

In accordance with another embodiment of the present invention, the computer correlates the sub-arrays by aligning particular elements in the first sub-array with particular elements in the second sub-array, by obtaining the differences between the values of the aligned elements in the sub-arrays, by obtaining the absolute values of the differences, by squaring the absolute values, by summing the results of the squaring operations, and by storing the sums as elements of the correlation array. After all of the elements of the correlation array have been produced, the computer determines which element of the correlation array has the smallest value, which corresponds to the overlapping image data.

After the computer determines the overlapping image data, the computer constructs the representation of the original image by eliminating the overlap. The overlap can be eliminated by any one of a plurality of methods. The computer can average the image data in the first sub-array that corresponds to the overlap with the data in the second sub-array that corresponds to the overlap. The average can be weighted in order to ensure that discontinuities resulting from offset and gain errors in the optical sensors are removed. Alternatively, the overlap can be eliminated by simply discarding the image data in the first sub-array that corresponds to the overlap. Interpolation techniques may be used to eliminate sub-pixel overlaps.

Other features and advantages of the present invention will become apparent from the following description, drawings and claims.

DETAILED DESCRIPTION OF THE INVENTION

Figure 1:
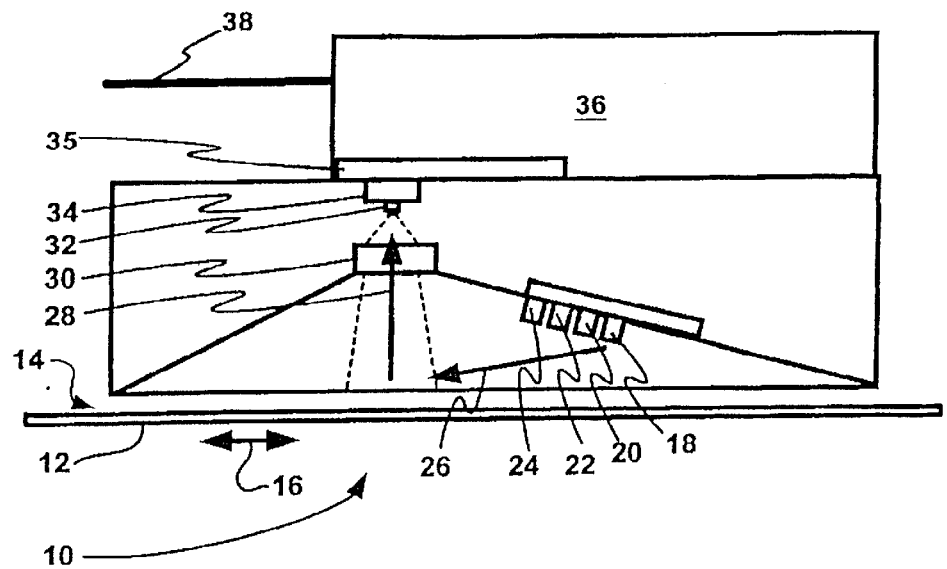
FIG. 1 illustrates the image scanning device of the present invention in accordance with the preferred embodiment.

FIG. 1 illustrates the image scanning device 10 of the present invention in accordance with the preferred embodiment, which may be incorporated in, for example, a facsimile machine, a copier machine, etc. It should be noted that the present invention is not limited to the arrangement shown in FIG. 1. The image scanning device 10 shown in FIG. 1 is merely the preferred embodiment for carrying out the present invention. It should be noted that the present invention is not limited to any particular type of image scanning device.

The image scanning device 10 is arranged to sense an image 14 disposed on the top surface of a document 12 which is moved longitudinally in the directions shown by the arrow 16 so that a single scan line across the width of the document 12 may be sensed at a time. The top surface of the document 12 preferably is illuminated by a series of light-emitting diodes (LEDs), which can generate the same or different colors, as will be apparent to those skilled in the art The LEDs 18, 20, 22, and 24 may be, for example, red, blue, green, and yellow, to provide the ability to sense different color images 14. Alternatively, the LEDs 18, 20, 22 and 24 may of the same color.

Light from the LEDs travels along the path 26 from the LEDs 18, 20, 22 and 24 during a scan and impinges on the top surface of the document 12 being scanned. The light passes along the line 28 through a lens array 30, which preferably is a molded plastic lens array, and is focused by the lens array 30 onto an optical image sensing device, which preferably comprises a plurality of photosensor arrays 32. The photosensor arrays 32 preferably are embedded in a molded lead frame 34.

The molded lead frame 34 has registration features (not shown) that allow accurate positioning of the lens array 30 to the molded lead frame. The registration features allow the molded lead frame to be accurately positioned in assembly equipment and allow the final scanner assembly to be precisely place by the final manufacture in the overall scanner assembly. The precision registration allows the semiconductor die 32 to be placed precisely relative to the molded lead frame and therefore to the optics 30.

For a full color image, three scans are used, commonly referred to as red, green, and blue scans. The spectral distribution of each scan can effect the scanner's ability to reproduce a true color. More than one color LED may be turned on per scan to create a better spectral distribution.

The photosensor arrays 32 are each comprised of a plurality of photosensor. Each of the photosensor arrays is connected to processing circuitry (not shown) contained in housing 36 which receives the electrical signals generated by the photosensor 32 is response to the light impinging thereon and processes the electrical signals into a form which is suitable for use with the particular image scanning device, e.g., facsimile machine, copier machine, etc., in which the present invention is incorporated. The processing circuitry is discussed in more detail below with respect to FIG. 3.

Figure 2:
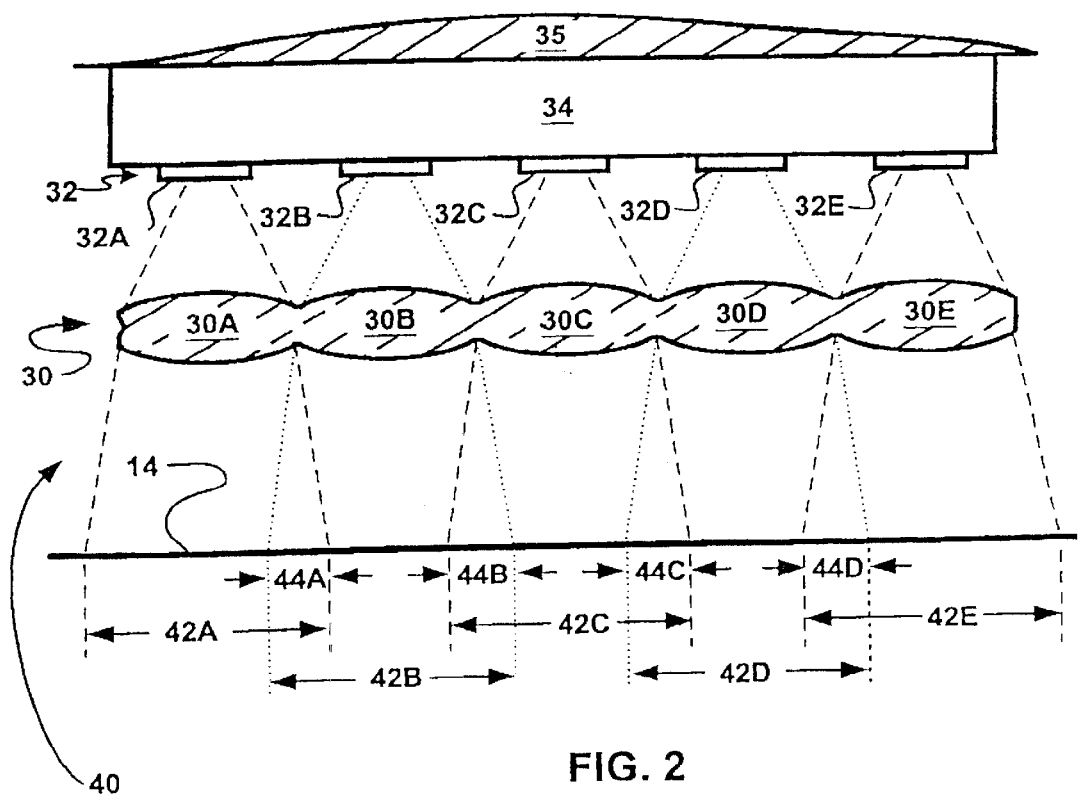
FIG. 2 illustrates a front view of a portion of the image scanning device which illustrates the imaging optics and the photosensor arrays utilized in the image scanning device.

FIG. 2 illustrates a front view of a portion of the image scanning device 10 which illustrates the imaging optics 40 and the photosensor arrays 32A–32E. The imaging optics 40 are comprised of a molded lens array 30, which is comprised of individual lenses 30A, 30B, 30C, 30D, and 30E as examples. Each of the lenses 30A, 30B, 30C, 30D, and 30E, has a cellular field of view 42A, 42B, 42C, 42D, and 42E, respectively. As indicated, the fields of view overlap. The overlaps are represented by numerals 44A, 44B, 44C, and 44D. The lens array 30 focuses the cellular fields of view 42A, 42B, 42C, 42D, and 42E onto respective photosensitive semiconductor dice 32A, 32B, 32C, 32D, and 32E.

Therefore, in accordance with the present invention, a plurality of optical lenses 30A–30E of the image scanning device 10 capture overlapping images of a document 12 being scanned as indicated by the overlapping fields of views produced by the imaging optics 40. By increasing the fields of view of the lenses 30A–30E of the imaging optics 40, a few lenses can be utilized to capture a 1-D scan of the entire document and the optical path between each image sensor and the document being scanned can be kept relatively short, thus ensuring a relatively small size in a direction parallel to the direction of the optical path. By utilizing overlapping fields of view, a 1-D scan of the entire document can be obtained while preventing gaps from existing in the image information being acquired by the photosensor arrays 32A–32E.

However, since the portion of the surface 14 of the document 12 scanned by each of the photosensor arrays produce overlapping images, the images acquired must be processed in order to determine the amount of overlap in the overlapping images before reconstructing the original image from the images obtained by the photosensor arrays. The manner in which this is accomplished will be discussed in detail below with reference to FIGS. 4 and 5.

Figure 3:
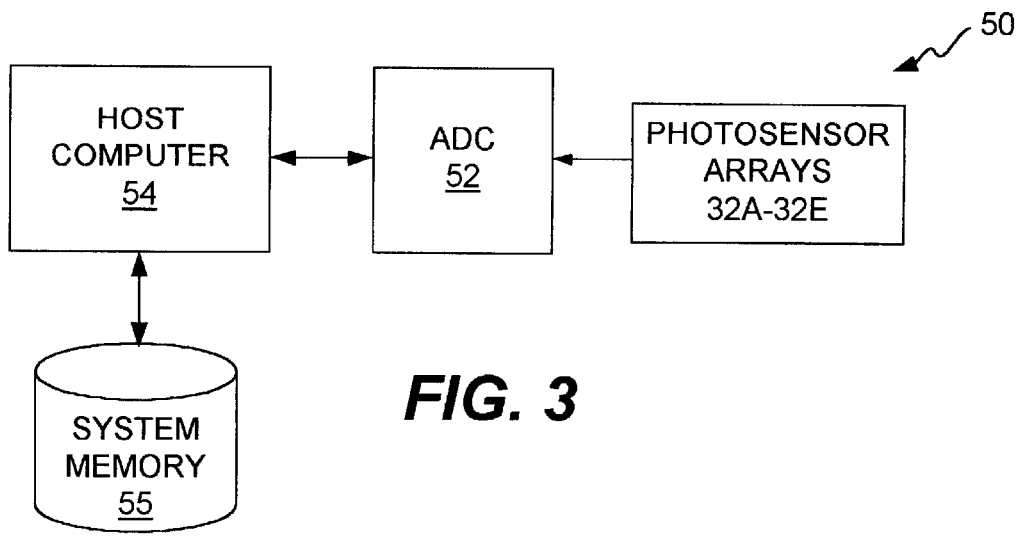
FIG. 3 illustrates a block diagram of the processing circuitry of the present invention which reconstructs the original image from the images obtained by the photosensor arrays.

FIG. 3 illustrates a block diagram of the processing circuitry 50 of the present invention which reconstructs the original image from the images obtained by the photosensor arrays 32A–32E. In accordance with the preferred embodiment of the present invention, the processing circuitry 50 comprises an analog-to-digital converter 52, a computer 54, and a system memory device 55 which stores the code to be executed by the computer 54 in accordance with the method of the present invention. The system memory device 55 is also used for storing the data corresponding to the image being scanned.

The computer 54 may be any type of computer such as, for example, a microprocessor, a microcontroller, an application specific integrated circuit (ASIC), a digital signal processor (DSP), etc. The computer 54 may or may not have on-board memory. If the computer 54 has on-board memory, the on-board memory may be used for storing the code to be executed by the computer 54 in accordance with the method of the present invention. The analog-to-digital converter (ADC) 52 receives the output of the photosensor arrays 32A–32E and converts the signals received into digital signals which are then stored in system memory device 55. Alternatively, the signals from ADC 52 may first be input to computer 54 where the are processed into a form suitable for storage in system memory device 55 and then subsequently stored in system memory device 55 by computer 54. In accordance with the preferred embodiment of the present invention, a separate ADC is allocated to receive the output of one of the photosensor arrays 32A–32E. This allows the output of each of the photosensor arrays to be processed very quickly in parallel and stored in system memory device 55.

The algorithm performed by computer 54 for determining the amount of overlap in the overlapping images generated by the photosensor will now be described below with respect to the flow chart of FIGS. 4–7. The flow charts of FIGS. 4–7 are functional representations of the steps performed by the computer 54 and do not depict the actual code executed by the computer 54. However, those skilled in the art will understand how actual code could be written to perform these functional steps. Therefore, in the interest of brevity, a detailed recitation of the actual code used to perform the steps shown in FIGS. 4–7 will not be provided.

Figure 4:
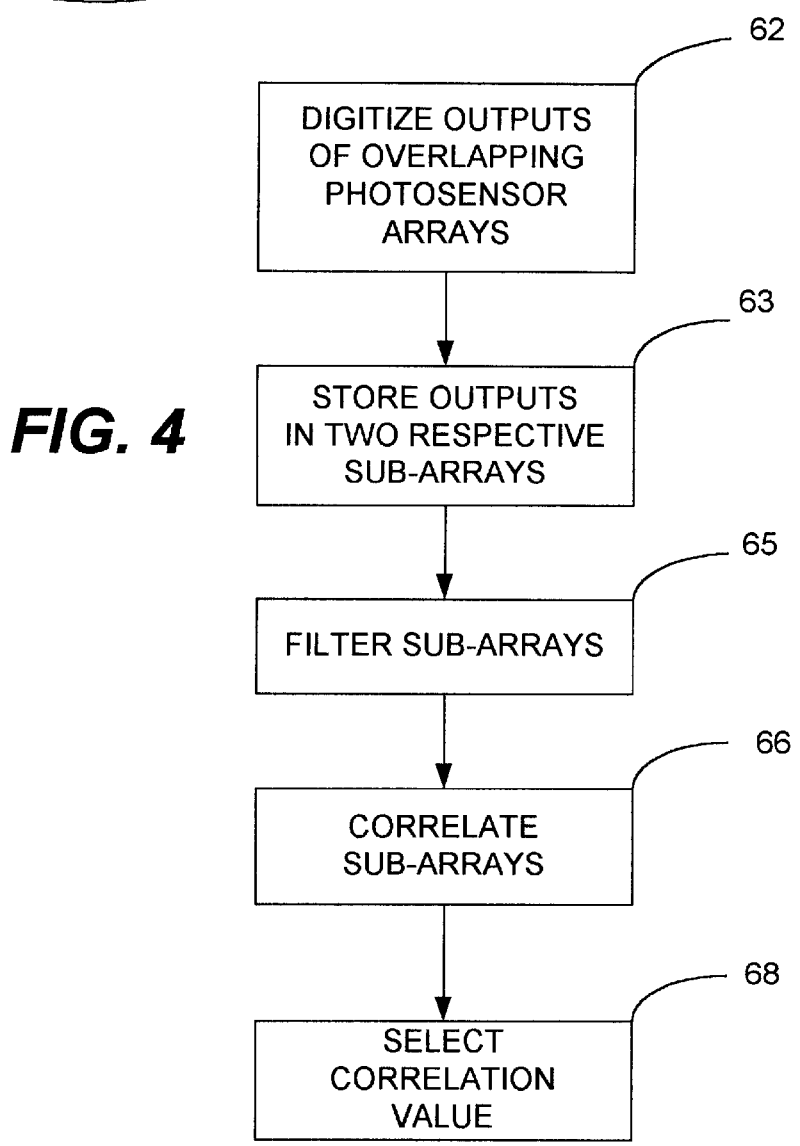
FIG. 4 is a flow chart functionally illustrating the preferred embodiment of the present invention for determining the amount of overlap in images obtained by adjacent photosensor of the photosensor arrays.

As the document 12 is scanned, the outputs of the individual photosensor in a pair of adjacent photosensor arrays are digitized, as indicated by block 62 of FIG. 4. The digitized outputs of the photosensor in each array which are suspected of overlapping are stored in two sub-arrays in system memory device 55, as indicated by block 63. Since the photosensor arrays 32 and the imaging optics 40 are arranged so that the fields of view overlap by a predetermined amount, the maximum possible amount of overlap, M, of photosensor of adjacent photosensor arrays is known. Therefore, each sub-array contains only elements which correspond to digitized outputs of potentially overlapping photosensor. Each sub-array will consist of elements 1 through M.

These two sub-arrays stored in system memory device 55 are the same size, i.e., have the same number of elements. In order to minimize any bias in the correlation array to be obtained using the values in the sub-arrays, each sub-array preferably is filtered with a DC removal filter to produce two essentially zero-mean sub-arrays, as indicated by block 65. Alternatively, each element of the sub-array may have the sub-array mean subtracted from it in order to produce the two essentially zero-means sub-arrays. It should be noted that the step of producing the two essentially zero-mean sub-arrays is optional, although it is preferable, as will be understood by those skilled in the art.

Figure 5A:
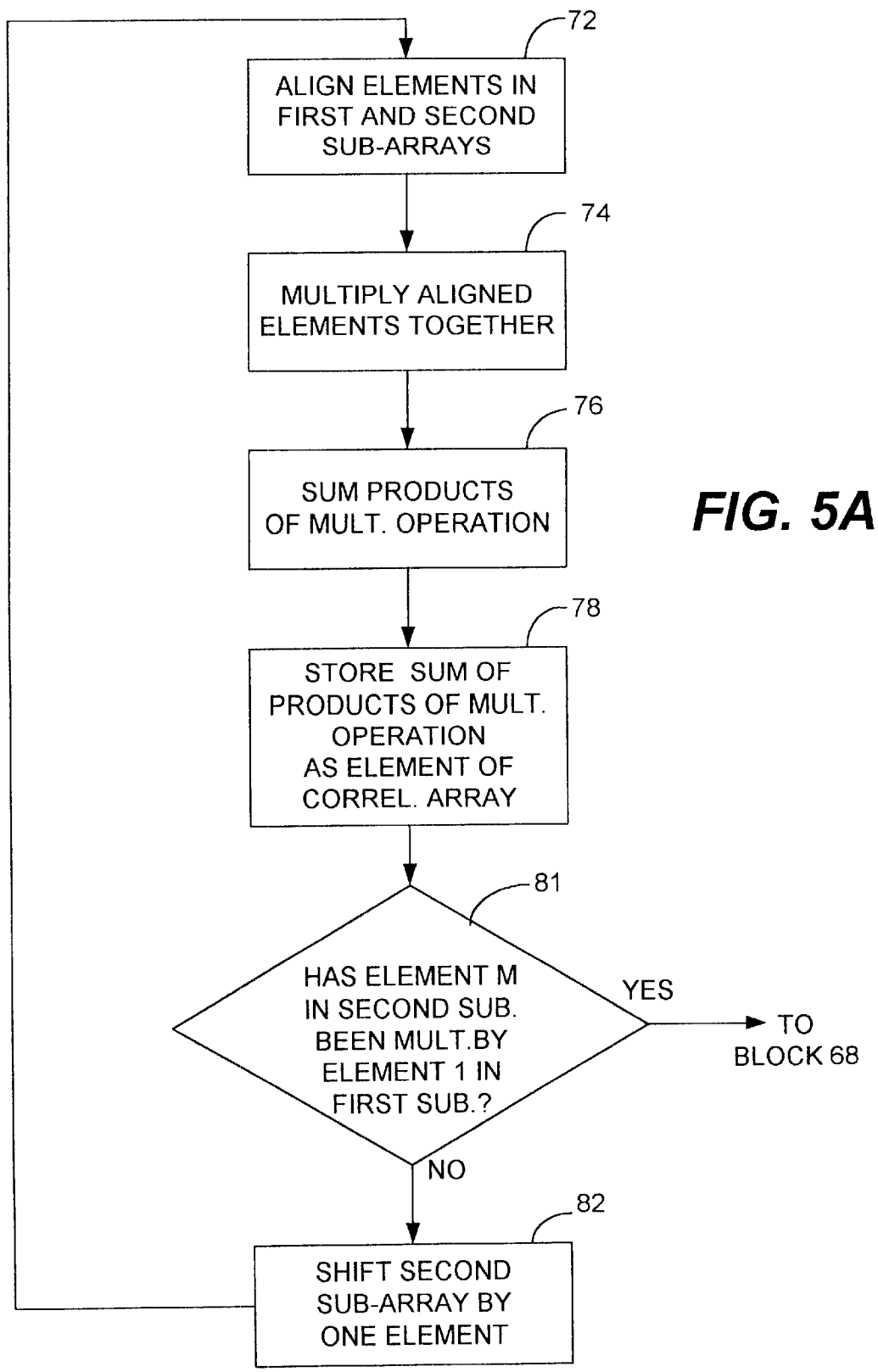
FIG. 5A is a flow chart which functionally illustrates the process corresponding to block 66 in FIG. 4 for correlating the two sub-arrays.
Figure 5B:
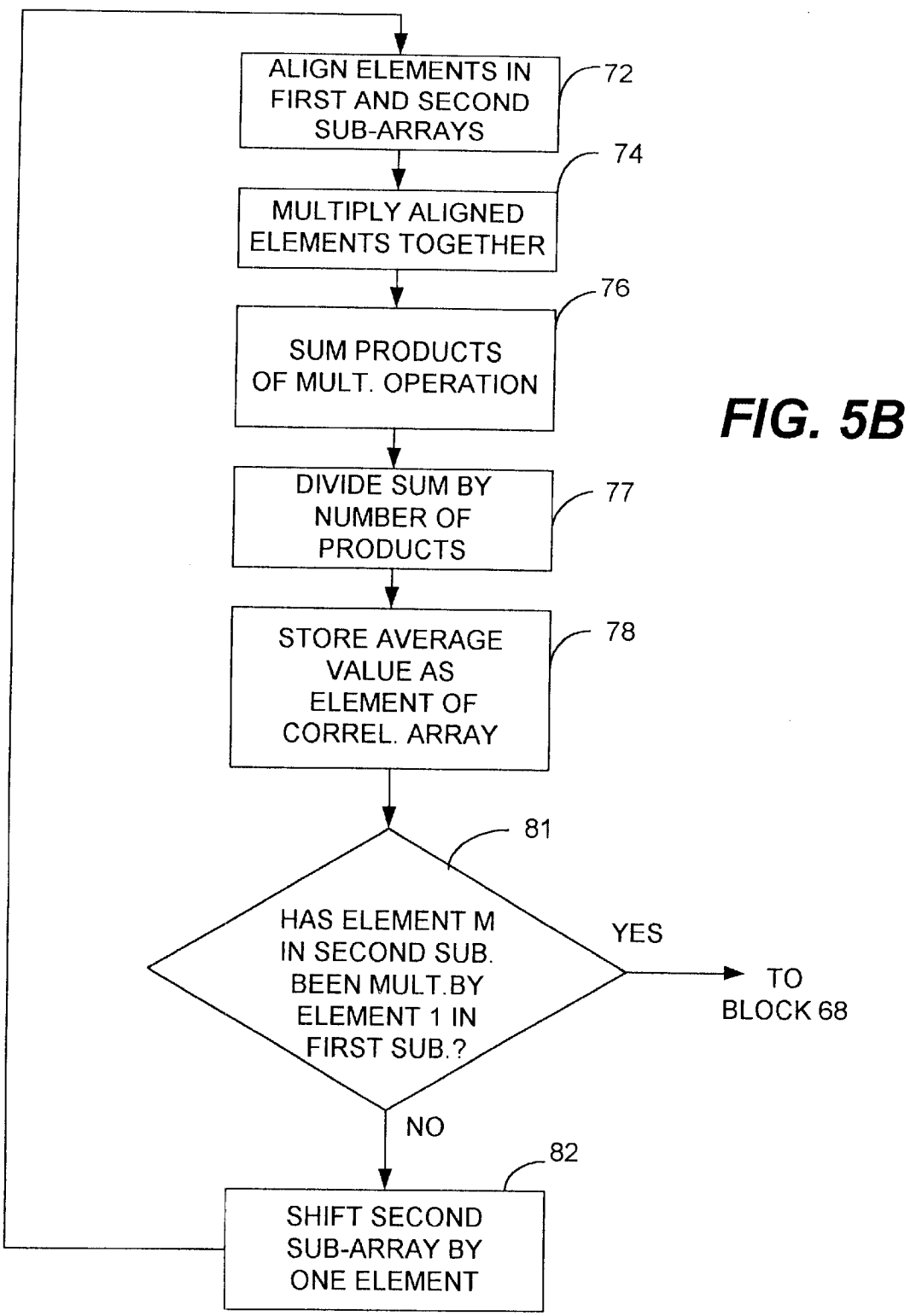
FIG. 5B illustrates an alternative embodiment of the method of the present invention for determining the amount of overlap in images obtained by adjacent photosensor of the photosensor arrays.
Figure 6:
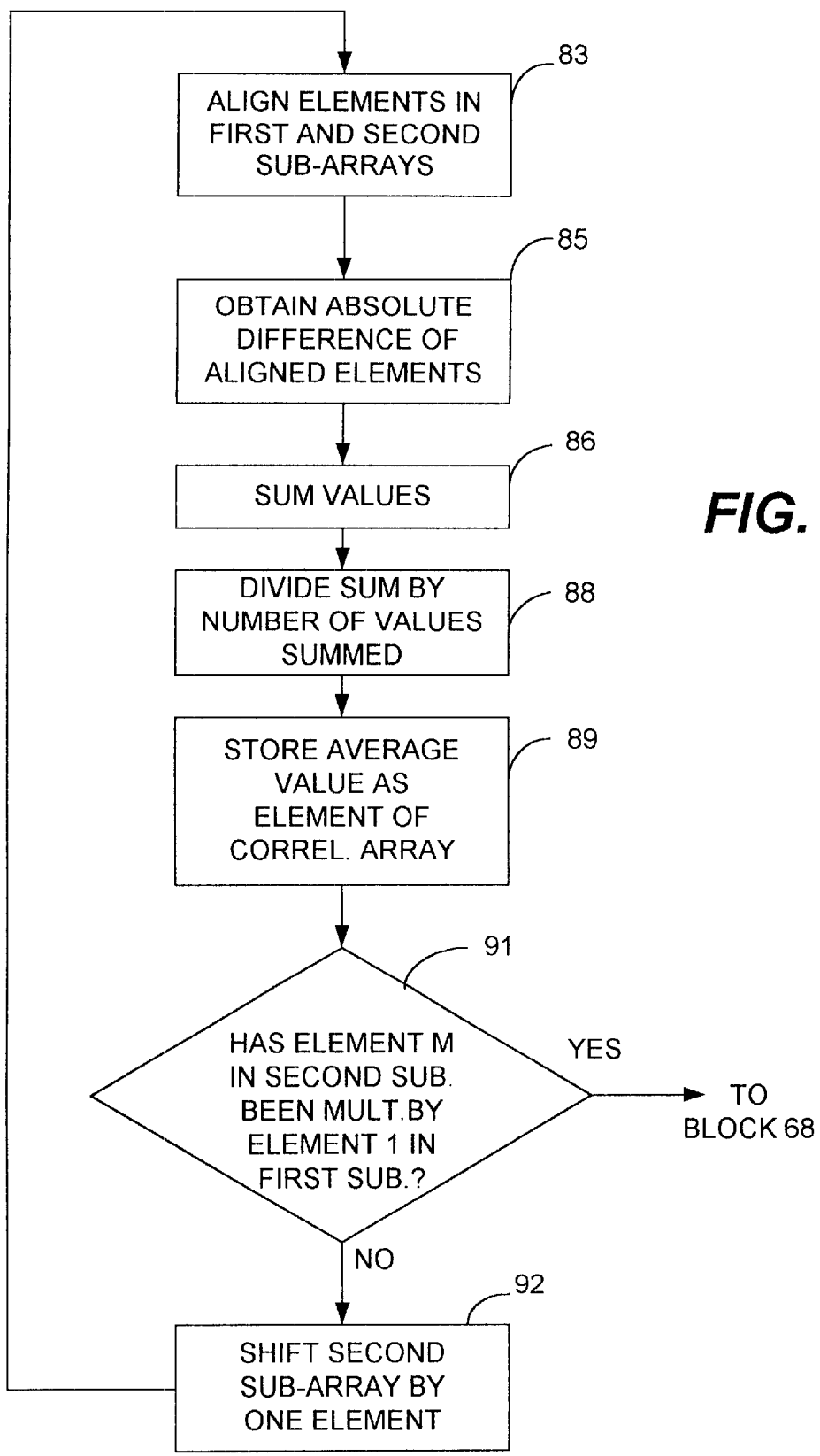
FIG. 6 represents an alternative embodiment of the present invention for determining the amount of overlap in images obtained by adjacent photosensor of the photosensor arrays.
Figure 7:
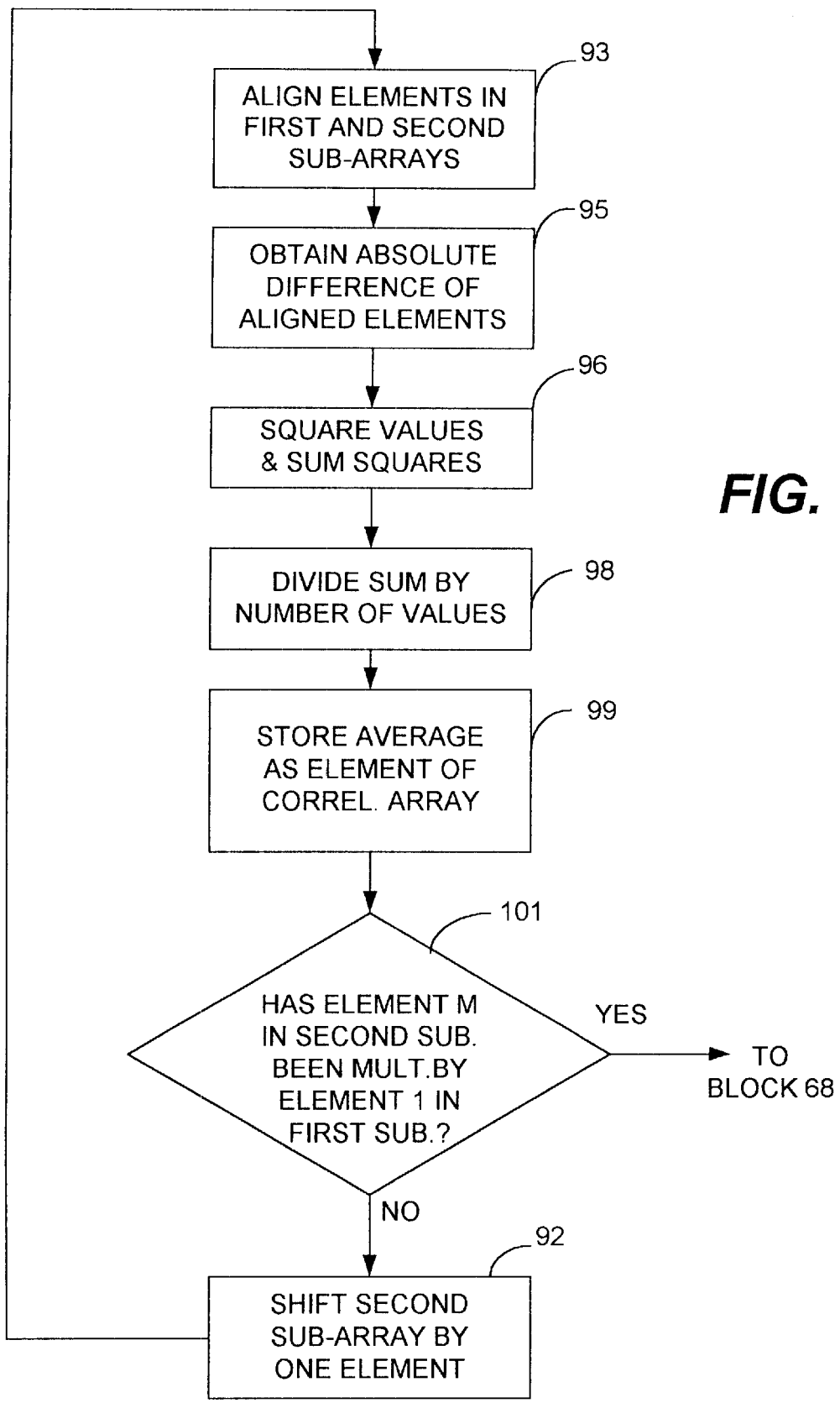
FIG. 7 represents an alternative embodiment of the present invention for determining the amount of overlap in images obtained by adjacent photosensor of the photosensor arrays.

The two subarrays are then correlated with each other using a cross-correlation algorithm to produce a correlation array, as indicated by block 66. Several different embodiments for producing the correlation array are discussed in detail below with reference to FIGS. 5A–7. Once the correlation array has been produced, a particular element in the correlation array, either the largest element or the smallest element, is selected, as indicated by block 68. The alignment of the sub-arrays corresponding to the selected element in the correlation array represents an estimate of the amount of overlap of the sub-arrays stored in system memory device 55. The largest element of the correlation array corresponds to the overlapping images when the embodiments of FIGS. 5A and 5B are used to obtain the elements of the correlation array, as discussed below in detail. When the embodiments discussed below with respect to FIGS. 6 and 7 are used to obtain the elements of the correlation array, the smallest element of the correlation array will correspond to the region of overlap. In order to obtain accuracy of less than a single pixel in the amount of overlap, a curve fitting technique can be used to fit the correlation data to an expected correlation curve, as will be understood by those skilled in the art.

Once the process represented by the flow chart of FIG. 4 has been performed, a more reliable measure of the amount of overlap of the sub-arrays may be obtained, if desired, by averaging several successive estimates of the determined amount of overlap or by creating a running average of the estimates, as will be understood by those skilled in the art. Alternatively, the successive estimates can be low pass filtered in order to obtain a more reliable measure of the amount of overlap, as will be understood by those skilled in the art. If insufficient detail is present in the overlap area to determine an accurate estimate of the amount of overlap, the lack of detail may be detected by observing either a low amplitude of filtered sub-arrays or by observing a low maximum correlation value. In the latter case, the previous best estimate of the amount of overlap should be used. If this best estimate of the amount of overlap is in error, the error is not of great significance since the lack of detail in the overlap area implies that an accurate combination is not necessary.

FIG. 5A is a flow chart which functionally illustrates the process corresponding to block 66 in FIG. 4 for correlating the two sub-arrays. Each sub-array is a 1-D array representing a 1-D scan of the document 12. As stated above, each sub-array consists of elements 1 through M. The last element of the first sub-array, $M_1$, is then aligned with the first element of the second sub-array, element $1_2$, as indicated by block 72. These elements of the sub-arrays are then multiplied together, as indicated by block 74. The first time through the process represented by FIG. 5A, only one product is obtained since only one element in the first sub-array is aligned with only one element in the second sub-array. Therefore, this product of the multiplication operation is stored as the first element in the correlation array, as indicated by block 76. However, after the process of FIG. 5A has been performed the first time and prior to the last time it is performed for a given set of sub-arrays, multiple elements in the first sub-array will be aligned with multiple elements in the second sub-array. Consequently, multiple products will obtained during the step represented by block 74. In these cases, the products are added together, as indicated by block 76, and the sum of the products is stored in the correlation array as the correlation array element during the step represented by block 78.

After the product or sum of the products have been stored in the system memory device, a determination is made as to whether the last element in the second sub-array, element M has already been aligned and multiplied with the first element of the first sub-array, as indicated by block 81. If not, the second sub-array is then shifted by one sub-array element with respect to the first sub-array so that the next element of the first sub-array is aligned with the next element of the second sub-array, as indicated by block 82. The aligned elements are then multiplied and the product of this multiplication operation is added to the product of the previous multiplication operation during the steps represented by blocks 74 and 76. The sum of these products is then stored as the next element in the correlation array during the step represented by block 80.

The process represented by blocks 72, 74, 76, 78, 81 and 82 continues until the first element of the first sub-array, element $1_1$, has been multiplied by the last element of the second sub-array, element $M_2$, and all of the products have been summed and the sum has been stored as the last element in the correlation array. Once all of the values of the correlation array have been obtained, the step represented by block 68 in FIG. 4 is performed to determine the amount of overlap of the images represented by the sub-arrays.

FIG. 5B illustrates an alternative embodiment of the method of the present invention which is substantially identical to the method described above with respect to FIG. 5A except that an additional processing step, represented by block 77, has been included in the correlation process. As stated above, in order to minimize bias in the correlation array, each sub-array preferably is filtered with a DC removal filter to produce two essentially zero-mean sub-arrays, as indicated by block 65 in FIG. 4. An alternative to using the filtering step represented by block 65 is to divide the sum of the products obtained at step 76 by the total number of the products. This division step, represented by block 77, averages the product values to minimize bias in the correlation array, as will be understood by those skilled in the art.

FIG. 6 represents an alternative embodiment of the present invention for obtaining the correlation array. The process represented by the flow chart of FIG. 6 is substantially identical to the processes represented by the flow chart of FIG. 5B except that block 74 in FIG. 5B has been replaced by block 85 in FIG. 6. Rather than using the products of the aligned elements of the sub-arrays to obtain the values for the correlation array, the absolute value of the difference, or the absolute difference, between the aligned elements of the sub-arrays may be utilized to generate the elements of the correlation array. At the step represented by block 85, the absolute values of the differences between the aligned elements are obtained. These values are then summed during the step represented by block 86. The remainder of the process is identical to the process represented by the flow chart of FIG. 5B.

When the absolute value of the differences between the aligned elements is used to generate the correlation array, the smallest, rather than the largest, element in the correlation array will be chosen as the best correlation number, which corresponds to the amount of overlap in the images. Errors relating to bias induced in the correlation array are possible if the absolute difference is used. The bias will be minimized by the division step represented by block 89. However, although the step represented by block 89 preferably is performed in this embodiment, those skilled in the art will understand that this step is not necessary. Preferably, the products of the aligned elements are used to generate the correlation array, as discussed above with respect to FIGS. 5A and 5B.

FIG. 7 represents an alternative embodiment which is substantially identical to the embodiments discussed above with respect to FIG. 5B except that the step represented by block 86 in FIG. 6 has been modified. As with the embodiment discussed above with respect to FIG. 6, the absolute differences of the aligned sub-array elements are used rather than their products. However, instead of summing the absolute differences and storing these sums as the values in the correlation array, the absolute differences are squared and then the squared values are stored in system memory as the elements of the correlation array, as indicated by block 96. The smallest element in the correlation array will be chosen as the best correlation number, which corresponds to the amount of overlap in the images. All of the remaining steps are identical to the those discussed above with respect to FIGS. 5B and 6. As with the embodiment of FIG. 6, the division step 99 in FIG. 7 is preferable but not necessary, as will be understood by those skilled in the art. Functions other than a squarring function may be applied to the absolute difference data on order to generate the correlation array, as will be understood by those skilled in the art. For example, the absolute difference could be raised to some other power, e.g., three.

Figure 8:
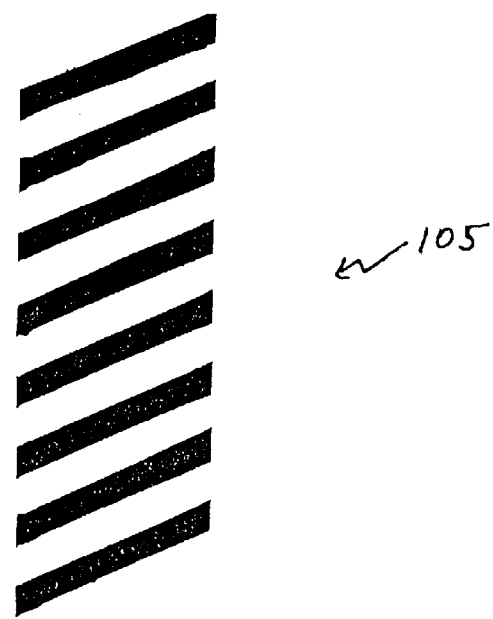
FIG. 8 illustrates an original image to be scanned by the image scanning device shown in FIG. 1.
Figure 9:
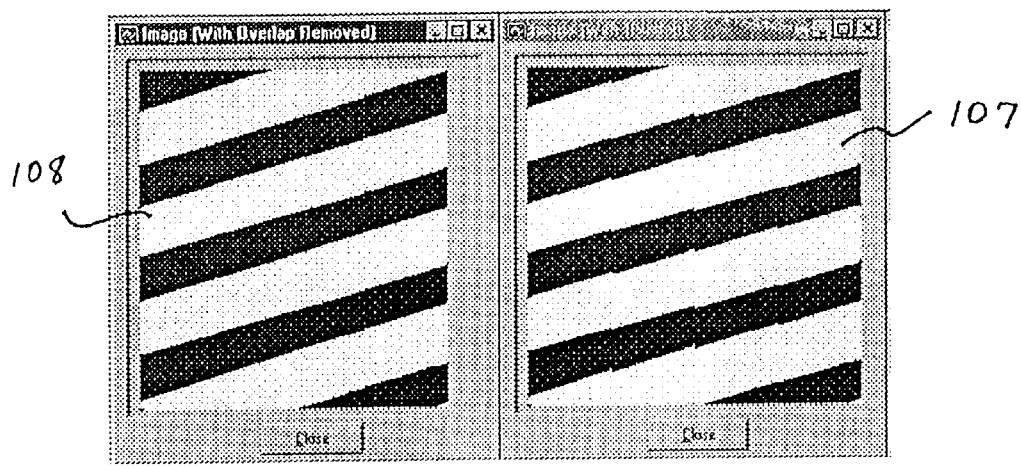
FIG. 9 illustrates reproductions of the image shown in FIG. 8 before the overlap in the image has been corrected and after the final overlap has been corrected in accordance with the method of the present invention.

FIG. 8 is an image 105 contained on a document (not shown) being scanned by the image scanning device 10 shown in FIG. 1. For ease of illustration, the image 105 is comprised of black and white colors only. Preferably, the image sensor 32 of the present invention comprises four photosensor arrays, as shown in FIG. 2. When the image 105 is scanned, the image sensor 32 comprising the photosensor arrays 32A–32E produces the image 107 shown in window 107 in FIG. 9. As can be seen in FIG. 9, the image displayed on the display in window 107 contains overlapping regions as opposed to the non-overlapping image regions of original image 105. The computer 54 then generates the image shown in window 108 by performing the correlation algorithm discussed above with respect to FIGS. 4–7. The image shown in window 108 represents the final image with the overlap corrected by the correlation algorithm of the present invention.

Once the value in the correlation array has been found which corresponds to the overlapping image data in the sub-arrays, the overlap is eliminated in order to construct a duplicate of the original image. The overlap can be eliminated by using any one of a plurality of methods. One way of eliminating the overlap is to simply discard the data in one of the sub-arrays corresponding to the overlap. Another method for eliminating the overlap is to average the data corresponding to the overlap in one subarray with the data corresponding to the overlap in the other sub-array. Any discontinuities in the data resulting from offset and/or gain errors in the photosensor can be eliminated by using a weighted average instead of a straight average, as will be understood by those skilled in the art. If the amount of overlapping data is not an integer number of pixels, but rather, includes a sub-pixel amount of overlap, interpolation techniques can be used to eliminate the sub-pixel overlap, as will be understood by those skilled in the art.

It will be understood by those skilled in the art that the present invention has been described with respect to the preferred embodiments and that the present invention is not limited to these embodiments. For example, although the method of the present invention has been described with respect to its preferred implementation with the image scanning device 10 shown in FIG. 1, those skilled in the art will understand that the method of the present invention described above with respect to FIGS. 4–7 is not limited to use with any particular image scanning device. It should also be noted that the steps shown in FIGS. 4–7 can be implemented in hardware, software, or a combination of hardware and software, as will be understood by those skilled in the art. When implemented in software, the software can be stored on any type of computer-readable medium available now or in the future including, but not limited to, read only memory (ROM) devices, random access memory (RAM) devices, optical storage devices, such as, for example, compact disks, and magnetic storage devices, such as, for example, floppy disks. It will also be apparent to those skilled in the art that modifications other than those explicitly mentioned above may be made to the embodiments discussed above which are within the scope of the present invention.

What is claimed is:

1. A processing device for use in an optical scanning device for constructing a representation of an original image scanned by the optical scanning device, the optical scanning device comprising at least a first and a second optical sensor, the first and second optical sensors having fields of view which at least partially overlap, each optical sensor generating electrical signals relating to a portion of the original image within the field of view of the respective optical sensor, the processing device being in communication with the optical sensors for receiving the electrical signals generated by the optical sensors, the processing device comprising:

logic configured to process the electrical signals received from the first and second optical sensors to determine an amount by which the portions of the original image viewed by the first and second optical sensors overlap, the processing device determining said amount of overlap by performing cross-correlation using the electrical signals produced by the first and second optical sensors to obtain a correlation value, the processing device using the correlation value to determine the amount of overlap, the processing device using the determined amount of overlap to construct a representation of the original image.

2. The apparatus of claim 1, wherein said logic comprises:

an analog-to-digital converter which receives the electrical signals produced by the optical sensors and generates first and second digital representations, the first digital representation associated with the portion of the original image within the field of view of the first optical sensor, the second digital representation associated with the portion of the original image within the field of view of the second optical sensor; and a computer in communication with the analog-to-digital converter, the computer receiving the first and second digital representations and cross-correlating the digital representations to determine said amount of overlap, the computer removing the determined amount of overlap from the scanned image to construct said representation of the original image.

3. The apparatus of claim 2, wherein said logic further comprises:

a memory device in communication with the computer, the computer storing first and second sub-arrays of image data in the memory device, the first sub-array corresponding to at least a portion of the first digital representation, the second sub-array corresponding to at least a portion of the second digital representation, wherein the computer cross-correlates the first sub-array with the second sub-array to determine said amount of overlap, wherein the portions of the first and second digital representations contained in the first and second sub-arrays, respectively, correspond to an amount of potential overlap between the portions of the original image viewed by the first and second optical sensors.

4. The apparatus of claim 3, wherein each sub-array is arranged as a one-dimensional array of data, wherein the computer correlates the sub-arrays by aligning one or more particular elements in the first sub-array with one or more particular elements in the second sub-array, by multiplying the aligned elements together, by summing the products obtained as a result of the multiplication operations, and by storing the sum of the products in the memory device as elements in a correlation array, wherein after all of the elements of the correlation array have been produced, the computer determines which element of the correlation array has the largest value, wherein the largest value of the correlation array corresponds to overlap in the digital representations contained in the sub-arrays.

5. The apparatus of claim 3, wherein each sub-array is arranged as a one-dimensional array of data, wherein the computer correlates the sub-arrays by aligning one or more particular elements in the first sub-array with one or more particular elements in the second sub-array, by multiplying the aligned elements together, by averaging the products obtained as a result of the multiplication operations to obtain correlation values, and by storing the correlation values in the memory device as elements in the correlation array, wherein after all of the elements of the correlation array have been produced, the computer determines which element of the correlation array has the largest value, wherein the element having the largest value of the correlation array corresponds to overlap in the digital representations contained in the sub-arrays.

6. The apparatus of claim 3, wherein each sub-array is arranged as a one-dimensional array of data, wherein the computer correlates the sub-arrays by aligning one or more particular elements in the first sub-array with one or more particular elements in the second sub-array, by obtaining the differences between the values of the aligned elements in the sub-arrays, by obtaining the absolute values of the differences, by averaging the absolute values to obtain correlation values, and by storing the correlation values in the memory device as elements of a correlation array, wherein after all of the elements of the correlation array have been produced, the computer determines which element of the correlation array has the smallest value, wherein the smallest element of the correlation array corresponds to the amount of overlap in the images represented by the sub-arrays.

7. The apparatus of claim 3, wherein each sub-array is arranged as a one-dimensional array of data, wherein the computer correlates the sub-arrays by aligning one or more particular elements in the first sub-array with one or more particular elements in the second sub-array, by obtaining the differences between the values of the aligned elements in the sub-arrays, by obtaining the absolute values of the differences, by squaring the absolute values, by averaging the results of the squaring operations to obtain correlation values, and by storing the correlation values in the memory device as elements of the correlation array, wherein after all of the elements of the correlation array have been produced, the computer determines which element of the correlation array has the smallest value, wherein the smallest element of the correlation array corresponds to the amount of overlap in the images represented by the sub-arrays.

8. The apparatus of claim 3, wherein after the computer determines the amount of overlap, the computer eliminates redundant data corresponding to the overlap by averaging the portion of the data in the first sub-array that corresponds to the overlap with the portion of the data in the second sub-array that corresponds to the overlap.

9. The apparatus of claim 3, wherein after the computer determines the amount of overlap, the computer eliminates redundant data corresponding to the overlap by discarding the portion of the data in the first sub-array that corresponds to the overlap.

10. A method for constructing a representation of an original image which has been optically scanned with an optical scanning device, the method comprising the steps of:

processing electrical signals produced by first and second optical sensors of the optical scanning device, each optical sensor having a field of view associated therewith, and wherein the fields of view of the optical sensors at least partially overlap, wherein the electrical signals generated by each optical sensor relate to a portion of the original image within the field of view of the respective optical sensor, the electrical signals being processed in accordance with a cross-correlation algorithm to obtain a correlation value which is used to determine an amount by which the portions of the original image within the fields of view of the optical sensors overlap; and using the determined amount of overlap to construct a representation of the original image.

11. The method of claim 10, wherein the step of processing the electrical signals further includes the step of:

prior to processing the electrical signals in accordance with the cross-correlation correlation algorithm, converting the electrical signals into first and second digital representations of the portions of the original image within the fields of view of the first and second optical sensors.

12. The method of claim 11, wherein the step of processing the digital representations further comprises the steps of:

after the step of converting the electrical signals into digital representations, arranging the digital representations into first and second sub-arrays of image data, the first sub-array containing a portion of the first digital representation corresponding to a potential amount of overlap between the portions of the original image within the fields of view of said first and second optical sensors, the second sub-array containing a portion of the second digital representation corresponding to a potential amount of overlap between the portions of the original image within the fields of view of said first and second optical sensors;

storing the first and second sub-arrays of image data in a memory device, wherein the correlation algorithm is performed by a computer which correlates the first and second sub-arrays with each other to determine the amount of overlap of the portions of the images within the fields of view of the first and second adjacent optical sensors.

13. The method of claim 12, wherein each sub-array is arranged as a one-dimensional array of data, and wherein the computer correlates the sub-arrays by aligning one or more particular elements in the first sub-array with one or more particular elements in the second sub-array, by multiplying the aligned elements together, by summing the products obtained as a result of the multiplication operations to obtain correlation values, and by storing the correlation values as elements in a correlation array, wherein after all of the elements of the correlation array have been produced, the computer determines which element of the correlation array has the largest value, wherein the element in the correlation array having the largest value corresponds to the overlapping image data contained in the sub-arrays.

14. The method of claim 12, wherein each sub-array is arranged as a one-dimensional array of data, and wherein the computer correlates the sub-arrays by aligning particular elements in the first sub-array with particular elements in the second sub-array, by obtaining the differences between the values of the aligned elements in the sub-arrays, by obtaining the absolute values of the differences, by averaging the absolute values to obtain correlation values, and by storing the correlation values as elements of a correlation array, wherein after all of the elements of the correlation array have been produced, the computer determines which element of the correlation array has the smallest value, wherein the element in the correlation array having the smallest value corresponds to the overlapping image data contained in the sub-arrays.

15. The method of claim 12, wherein each sub-array is arranged as a one-dimensional array of data, and wherein the correlation step is performed in a computer, wherein the computer correlates the sub-arrays by aligning particular elements in the first sub-array with particular elements in the second sub-array, by obtaining the differences between the values of the aligned elements in the sub-arrays, by obtaining the absolute values of the differences, by squaring the absolute values, by summing the results of the squaring operations, and by storing the sums in a memory element as elements of a correlation array, wherein after all of the elements of the correlation array have been produced, the computer determines which element of the correlation array has the smallest value, wherein the element in the correlation array having the smallest value corresponds to the amount of overlap in the images represented by the sub-arrays.

16. The method of claim 12, wherein after the computer determines the amount of overlap, in the using step, the computer eliminates redundant image data corresponding to the overlap by averaging the portion of the image data in the first sub-array that corresponds to the overlap with the portion of the image data in the second sub-array that corresponds to the overlap.

17. The method of claim 12, wherein after the computer determines the amount of overlap, in the using step, the computer eliminates redundant image data corresponding to the overlap by discarding the portion of the data in the first sub-array that corresponds to the overlap.

18. A computer program embodied on a computer-readable medium, the computer program correlating a first sub-array of image data with a second sub-array of image data to determine an amount by which the image data contained in the first sub-array overlaps the image data in the second sub-array, the computer program using the determined amount of overlap to construct a representation of an original image, the computer program comprising:

a first code segment for aligning one or more particular elements in the first sub-array with one or more particular elements in the second sub-array;

a second code segment for obtaining the differences-between the values of the aligned elements in the sub-arrays;

a third code segment for obtaining absolute values of the differences;

a fourth code segment for averaging the absolute values to obtain correlation values;

a fifth code segment for storing the correlation values in a memory device as elements of a correlation array;

a sixth code segment for determining which element of the correlation array has the smallest value, wherein the element in the correlation array with the smallest value corresponds to the overlapping image data contained in the sub-arrays.

19. A computer program embodied on a computer-readable medium, the computer program correlating a first sub-array of image data with a second sub-array of image data to determine an amount by which the image data contained in the first sub-array overlaps the image data in the second sub-array, the computer program using the determined amount of overlap to construct a representation of an original image, the computer program comprising:

a first code segment for aligning one or more particular elements in the first sub-array with one or more particular elements in the second sub-array;

a second code segment for multiplying the values of the aligned elements in the sub-arrays together;

a third code segment for summing the products of the multiplied values to obtain correlation values;

a fourth code segment for storing the correlation values in a memory device as elements of a correlation array;

a fifth code segment for determining which element of the correlation array has the largest value, wherein the element in the correlation array with the largest value corresponds to the overlapping image data contained in the sub-arrays.

20. A computer program embodied on a computer-readable medium, the computer program correlating a first sub-array of image data with a second sub-array of image data to determine an amount by which the image data contained in the first sub-array overlaps the image data in the second sub-array, the computer program using the determined amount of overlap to construct a representation of an original image, the computer program comprising:

a first code segment for aligning one or more particular elements in the first sub-array with one or more particular elements in the second sub-array;

a second code segment for multiplying the values of the aligned elements in the sub-arrays together;

a third code segment for averaging the products of the multiplied values to obtain correlation values;

a fourth code segment for storing the correlation values in a memory device as elements of a correlation array;

a fifth code segment for determining which element of the correlation array has the largest value, wherein the element in the correlation array with the largest value corresponds to the overlapping image data contained in the sub-arrays.

* * * * *